3,183,209
ORGANOPOLYSILOXANES

Homer A. Hartung, Grand Island, and Robert C. Borchert, Tonawanda, N.Y., assignors to Union Carbide Corporation, a corporation of New York
No Drawing. Filed Apr. 28, 1960, Ser. No. 25,205
6 Claims. (Cl. 260—46.5)

This invention relates to novel linear, vinyl-containing organopolysiloxanes. More particularly, this invention relates to linear, organopolysiloxanes containing diphenylsiloxane units and methylvinylsiloxane units and which can also contain combined dimethylsiloxane units and $R_3SiO_{0.5}$ units where R is a monovalent hydrocarbon group. These diorganopolysiloxanes when cured through the vinyl groups yield solid organosiloxane resins having good thermal properties and unexpectedly good stress-strain properties.

Heretofore siloxane resins have been prepared by curing siloxane intermediates produced by the cohydrolysis and cocondensations of hydrolyzable trifunctional organosilanes or by cohydrolysis and cocondensation of mixture of hydrolyzable trifunctional and difunctional organosilanes. The siloxane resins heretofore known contained as substituent groups methyl, ethyl, propyl, vinyl, allyl, phenyl, tolyl, and/or other monovalent hydrocarbon radicals. The siloxane resin intermediates are normally termed hydrolyzates and are partially cross-linked materials containing residual hydrolyzable groups bonded to the silicon atoms thereof and are normally cured to resins by the condensation of the hydrolyzable groups. These siloxane resin intermediates require a solvent such as benzene, toluene and the like in order to allow the siloxanes to flow into the area on which it is to be deposited. The solvent must then be driven off and the siloxanes cured in the desired place.

Driving off the solvent does not present any problem for thin layers of the siloxane or in any application wherein the solvent can readily escape from the siloxane. If deep sections of the siloxane resins are sought, the solvent can not readily escape and as a result voids or bubbles are present in the cured resins. Furthermore, the use of such solvent oftentimes presents a fire hazard.

It is also known to prepare siloxane resins by curing siloxanes containing phenylvinylsiloxane units and phenylmethylsiloxane units employing free radical catalysts. One such known method comprises forming a siloxane fluid composed essentially of from 20 to 75 mole percent phenylvinyl siloxane, from 80 to 25 mole percent phenylmethylsiloxane and up to 5 mole percent of a siloxane of the unit formula $R_3SiO_{0.5}$ where R is an alkyl, cycloalkyl or an aryl radical.

It is a primary object of this invention to prepare organosiloxane resins having good thermal integrity and improved stress-strain properties from organosiloxane fluids which can be employed in a solvent-free state. Other objects and advantages of the compositions of this invention will be apparent from the following descriptions.

The organosiloxane fluids of this invention which can be cured to yield organosiloxane resins of good thermal stability and improved stress-strain properties contain diphenylsiloxane units, methylvinylsiloxane units and may contain dimethylsiloxane units and units of the formula $R_3$—Si—$O_{0.5}$ where R is an alkyl, cycloalkyl or an aryl radical. We have found that organosiloxane resins having good thermal integrities and unexpectedly good stress-strain properties are obtained providing the constituents of the organosiloxane fluids are kept within the hereinafter described limits and the molecular weight of the organosiloxane fluid is above about 4000. Illustrative of the radicals that R can represent are alkyl groups such as methyl, ethyl, propyl and the like; cycloalkyl groups such as cyclohexyl and the like; and aryl groups such as phenyl, naphthyl and the like.

One specific type of organosiloxane fluid that we have found gives organosiloxane resins having particularly good tensile strengths and improved thermal integrity are those polymeric organosiloxane fluids having a molecular weight of at least 4000 and containing (1) between 2.0 and 3.5 moles of methylvinylsiloxane units per kilogram of the total polymer, (2) at least 3.0 moles of diphenylsiloxane units per kilogram of the total polymer, (3) up to 3.16 moles of dimethylsiloxane units per kilogram of the total polymer and (4) up to 0.5 mole of $R_3SiO_{0.5}$ units per kilogram of the total polymer where R is as above defined. These organosiloxane fluids are more readily depicted as copolymeric organosiloxanes composed essentially of units of the formulas

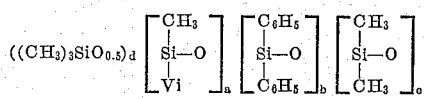

wherein Vi represents a vinyl group

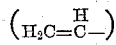

and $a$, $b$, $c$ and $d$ are integers selected so that amounts of the methylvinylsiloxane units, dimethylsiloxane units, ($R_3SiO_{0.5}$) units and the diphenylsiloxane units are maintained within the above-defined limits.

The limits described above for the concentration of the diphenylsiloxane units in the total polymer fluid is critical since it governs the resistance to cracking and crazing of the organosiloxane resin in thick section castings. More specifically, we have found that when the concentration of the diphenylsiloxane unit is below 3 moles of the diphenylsiloxane unit per kilogram of total polymer, the thermal integrity is extremely poor and the loss in weight at elevated temperatures is very high.

We have also found that when the amount of methylvinylsiloxane units in the total polymer is below 2.0 moles of the methylvinylsiloxane unit per kilogram of the total polymer, the cast resin will have an extremely low tensile strength, and hence concentrations of the methylvinylsiloxane unit below 2.0 moles per kilogram are undesirable. We have also found that when the amount of methylvinylsiloxane units in the total polymer is above 3.5 moles of methylvinylsiloxane units per kilogram of the polymer, the cast resins are extremely brittle and in addition the elongation values are extremely low.

The organosiloxane fluids of this invention are cured to organosiloxane resins by mixing them with from 0.5 to 2.0 percent by weight of a suitable curing catalyst. Suitable curing catalysts for the organosiloxane fluids of this invention are those compounds which are capable of generating free radicals when heated. Such curing catalysts are, for example, organic peroxides such as ditertiarybutyl peroxide, dicumyl peroxide and the like, and organic azo compounds such as, for example, azo-bis-isobutyronitrile and the like.

The temperature at which curing takes place will, of course, vary in accordance with the specific curing catalyst employed. In most instances curing can be accomplished at temperatures from about 100° C. to about 160° C. For example, when dicumyl peroxide is employed as the curing catalyst, it is preferred to heat the mixture to a temperature of about 135° C. for from 3 to 4 hours.

The organosiloxane fluids of this invention can be prepared by the alkaline equilibration of octaphenylcyclotetrasiloxane, tetramethyltetravinylcyclotetrasiloxane and where dimethylsiloxane units are present, octamethylcyclotetrasiloxane employing an alkali metal silanolate as the catalyst. Such catalysts are, for example, potassium dimethylsilanolate KO$(Me_2SiO)_x$—K and the like. The organosiloxane fluids of this invention can also be prepared by the cohydrolysis and co-condensation of the corresponding chlorosilanes, followed by equilibration with an alkaline catalyst such as potassium dimethylsilanolate.

For the purpose of simplicity and for ease in describing the concentration limits for the organosiloxane fluids and resins of this invention the concentration limits of the controlling units, e.g., methylvinylsiloxane and diphenylsiloxane units, are given in moles of the unit per kilogram of the total polymer. The concentration limits can be converted into weight percent by employing the following equation:

Weight percent of unit=

$$\frac{\text{moles of unit in one kilogram of polymer times the unit weight}}{10}$$

The unit concentration can also be converted from moles per kilogram to mole-percent by employing the following equation:

Mole-percent of unit=

$$\frac{100 \text{ times moles of unit per kilogram}}{\text{total number of moles of all units per kilogram}}$$

Thus, for example, in terms of weight percent, the fluids and resins of our invention can contain from 17.2 to 30.1 percent by weight methylvinylsiloxane units, from 59.4 to 82.8 percent by weight diphenylsiloxane units, from 0 to 23.4 percent by weight dimethylsiloxane units and from 0 to 4.05 percent by weight $R_3SiO_{0.5}$ units where R is methyl. Of course, it is understood that in those fluids where the R in the $R_3SiO_{0.5}$ unit is other than methyl the percent by weight will be slightly higher.

The organosiloxane resins of this invention find utility as a dielectric encapsulating or potting medium for electrical apparatus where a high degree of thermal integrity and good tensile strengths are required.

The following examples further illustrate the invention:

EXAMPLE 1

The following general procedure was employed to produce the organosiloxane fluids of this invention:

A reaction vessel equipped with a stirrer, thermometer and electric heating mantle was charged with the following materials:

Octaphenylcyclotetrasiloxane, $[(C_6H_5)_2SiO]_4$
Methylvinylcyclosiloxane, $[CH_3(CH_2=CH)SiO]_{3.4}$
Decamethyltetrasilaxane
$[(CH_3)_3SiO(CH_3)_2SiOSi(CH_3)_3]$
Octamethylcyclotetrasiloxane, $[(CH_3)_2SiO]_4$ The amounts of each of the above siloxanes employed was dependent upon the desired composition of the organosiloxane fluid to be produced. Sufficient potassium dimethylsilanolate (3% K, by weight) was added so that the final mixture contained at least 400 parts potassium per million parts of the mixture. The mixture was then heated to 150–158° C. and maintained at that temperature for at least 4 hours with stirring resulting in the mixture being equilibrated to an organosiloxane fluid. At the end of this period an amount of trimethylchlorosilane in excess of that required to react with all of the potassium catalyst present, was added to the hot fluid, thus rendering the catalyst inactive. A gas inlet was then put into the flask and the product was sparged with dry nitrogen while the temperature was increased to 185–195° C. After four hours of vigorous sparging, the nitrogen flow was stopped. A small amount of a filter aid such as diatomaceous earth was added and the fluid was filtered through a fritted glass funnel at a temperature of about 150° C.

A number of the organosiloxane fluids thus prepared are listed in the following table. All of these organosiloxane fluids are viscous, pourable liquids.

Table 1

ORGANOSILOXANE FLUID COMPOSITION

[Moles of unit/kg. of polymer [1]]

|   | $(C_6H_5)_2SiO$ | $CH_3ViSiO$ | $(CH_3)_3SiO_{0.5}$ |
|---|---|---|---|
| A | 2.5 | 2.5 | 0.4 |
| B | 2.5 | 3.0 | 0.4 |
| C | 2.5 | 3.5 | 0.4 |
| D | 3.0 | 2.0 | 0.4 |
| E | 3.0 | 2.5 | 0.4 |
| F | 3.0 | 3.0 | 0.4 |
| G | 3.0 | 3.5 | 0.4 |
| H | 3.1 | 2.3 | 0.4 |
| I | 3.2 | 2.8 | 0.4 |
| J | 3.5 | 1.5 | 0.4 |
| K | 3.5 | 2.0 | 0.1 |
| L | 3.5 | 2.0 | 0.4 |
| M | 3.5 | 2.5 | 0.4 |
| N | 3.5 | 2.5 | 0.2 |

[1] The remainder of the compositions being dimethylsiloxane units.

NOTE.—In the above table experiments A, B, C and J are control compositions.

EXAMPLE 2

The organosiloxane fluids prepared in Example 1 were cured to solid cast organosiloxane by the following procedure:

Dicumyl peroxide (1.5 parts by weight) was mixed with with the organosiloxane fluid (100 parts by weight). Five milliliters of the fluid was then poured into a 10 ml. beaker. The beaker and its contents was then placed in a forced draft oven and heated to 150° C. for four hours to give cured cast resins. The cured cast resins were then subject to a post-cure treatment of three hours in a 200° oven.

Thermal integrity was determined by putting three "beaker castings" of the fluids in the 250° C. forced draft oven for 2 hours. The "beaker castings" were then allowed to cool and were carefully examined for cracks or crate-marks. This procedure was repeated for an additional 2 hour heating cycle and then for 24 hour heating cycles. The hours of heating time elapsed before any of the three castings showed cracks or crazing was recorded as the minimum thermal integrity. The hours of heating time elapsed before all three samples cracked was recorded as the maximum thermal integrity.

The results obtained for the various cast organosiloxane resin compositions are listed below:

Table 2

| | Organosiloxane fluid composition, Moles of unit/kg. of polymer [1] | | | Thermal integrity of the resin (hours) | |
|---|---|---|---|---|---|
| | $\phi_2SiO$ | $CH_3ViSiO$ | $(CH_3)_3SiO_{0.5}$ | Minimum | Maximum |
| A | 2.5 | 2.5 | 0.4 | | 0 |
| B | 2.5 | 3.0 | 0.4 | | 0 |
| C | 2.5 | 3.5 | 0.4 | | 0 |
| D | 3.0 | 2.0 | 0.4 | >364 | |
| E | 3.0 | 2.5 | 0.4 | | 364 |
| F | 3.0 | 3.0 | 0.4 | >694 | |
| G | 3.0 | 3.5 | 0.4 | 78 | >1,000 |
| H | 3.1 | 2.3 | 0.4 | >1,000 | |
| I | 3.2 | 2.8 | 0.4 | >1,000 | |
| J | 3.5 | 1.5 | 0.4 | | 0 |
| K | 3.5 | 2.0 | 0.1 | >364 | |
| L | 3.5 | 2.0 | 0.4 | >1,000 | |
| M | 3.5 | 2.5 | 0.4 | 910 | >1,000 |
| N | 3.5 | 2.5 | 0.2 | 244 | |

[1] The remainder of the compositions being dimethylsiloxane units. In cases where the test was not carried to completion, the total times of testing is indicated with the > sign.

It will be noted that the compositions of experiments A, B, C and J in contradistinction of the compositions of this invention (experiments D, E. F, G, H, I, K, L, M and N) had poor thermal integrity.

In the above table, of the compositions in accordance with this invention, Example D contained 2.7 moles of dimethylsiloxane units per kilogram of the polymer. The remaining examples in accordance with this invention contained lesser amounts of dimethylsiloxane units.

EXAMPLE 3

*Physical properties of the cured organosiloxane resins*

For physical testing organosiloxane fluids prepared according to the method of Example 1 were catalyzed with 1.5 parts dicumyl peroxide per 100 parts of the organosiloxane fluid were then cast into molds approximately ⅛-inch thick by six inches square. The catalyzed organosiloxane fluid was heated for four hours at 150° C. followed by a post-cure at 200° C. to cure it to an organosiloxane resin in the form of plaques approximately the size of the mold. It was shown that differences in peroxide loading and preliminary cure temperature caused variations in tensile and elongation after the mold cure. However, after three hours at 200° C. the cured organosiloxane resins appeared to reach a plateau in physical properties and this cure schedule was therefore employed to compare the effects of composition on properties.

The cured organosiloxane resins were tested for hardness with a Barcol tester. Dumbbell-shaped specimens were then cut out on a jigsaw for measurement of tensile strength and ultimate elongation according to the procedure set forth in ASTM No. D638–58. The results obtained are listed in the following table:

*Table 3*

ORGANOSILOXANE FLUID COMPOSITION

[Physical properties of the resin concentration, moles of unit/kg. of polymer [1]]

| Test No. | $\phi_2\text{SiO}$ | $\text{CH}_3(\text{Vi})\text{SiO}$ | $(\text{CH}_3)_3\text{SiO}_{0.5}$ | Tensile, p.s.i. | Elongation, percent | Barcol hardness |
|---|---|---|---|---|---|---|
| 1 | 3.5 | 1.5 | 0.1 | 350 | 83 | 0 |
| 2 | 3.5 | 1.5 | 0.4 | 120 | 103 | 0 |
| 3 | 3.19 | 2.42 | 0.3 | 1,500 | 3.5 | 60 |
| 4 | 3.9 | 2.0 | 0.4 | 2,780 | 5 | 76 |
| 5 | 2.5 | 2.5 | 0.4 | Cracked during curing | | 0 |
| 6 | 3.0 | 2.5 | 0.4 | 1,490 | 14 | 44 |
| 7 | 3.0 | 2.5 | 0.1 | 2,880 | 9 | 65 |
| 8 | 3.5 | 2.5 | 0.4 | 2,720 | 7 | 65 |
| 9 | 3.75 | 2.5 | 0.4 | 3,250 | 7 | 74 |
| 10 | 3.5 | 2.75 | 0.4 | 3,020 | 7 | 72 |
| 11 | 2.0 | 3.0 | 0.4 | 760 | 12 | 22 |
| 12 | 2.5 | 3.0 | 0.4 | 1,400 | 9 | 48 |
| 13 | 3.0 | 3.0 | 0.4 | 2,260 | 6 | 71 |
| 14 | 3.5 | 3.0 | 0.2 | 3,380 | 7 | 75 |
| 15 | 3.0 | 3.5 | 0.4 | 2,780 | 5 | 81 |

[1] The remainder of the compositions being dimethylsiloxane units.

In the above table the compositions of Tests Nos. 1, 2, 5, 11 and 12 are given for comparative purposes only.

In the above table, of the compositions in accordance with this invention, Test No. 7 contained 2.47 moles of dimethylsiloxane units per kilogram of the polymer. The remaining examples in accordance with this invention contained lesser amounts of dimethylsiloxane units.

In Tables 1, 2 and 3, $\phi$ represents a phenyl group and Vi represents a vinyl group.

We claim:

1. A copolymeric organosiloxane consisting of from 2.0 to 3.5 moles of methylvinylsiloxane units per kilogram of the total polymer, at least 3.0 moles of diphenylsiloxane units per kilogram of the total polymer, from 0 to 3.16 moles of dimethylsiloxane units per kilogram of the total polymer and from 0 to 0.5 mole of $(R_3SiO_{0.5})$ units per kilogram of the polymer wherein R is selected from the group consisting of alkyl, cycloalkyl, and aryl radicals, said copolymeric organosiloxane having a molecular weight above about 4000.

2. A copolymeric organosiloxane as claimed in claim 1 wherein each R is a methyl group.

3. A heat-curable composition of matter comprising (1) a copolymeric organosiloxane consisting of from 2.0 to 3.5 moles of methylvinylsiloxane units per kilogram of the total polymer, at least 3.0 moles of diphenylsiloxane units per kilogram of the total polymer, from 0 to 3.16 moles of dimethylsiloxane units per kilogram of the total polymer and from 0 to 0.5 mole of $(R_3SiO_{0.5})$ units per kilogram of the polymer wherein R is selected from the group consisting of alkyl, cycloalkyl and aryl radicals, said cyclopolymeric organosiloxane having a molecular weight above about 4000 and (2) a free radical producing curing catalyst.

4. A heat-curable composition of matter as claimed in claim 3, wherein the curing catalyst is dicumyl peroxide.

5. A heat-curable composition of matter comprising (1) a copolymeric organosiloxane consisting of 2.42 moles of methylvinylsiloxane units per kilogram of the total polymer, 3.19 moles of diphenylsiloxane units per kilogram of total polymer, 1.84 moles of dimethylsiloxane units per kilogram of total polymer and 0.3 mole of $(CH_3)_3SiO_{0.5}$ units per kilogram of total polymer, said copolymeric organosiloxane having a molecular weight above about 4000 and (2) dicumyl peroxide.

6. A heat-cured composition obtained from a copolymeric organosiloxane consisting of from 2.0 to 3.5 moles of methylvinylsiloxane units per kilogram of the total polymer, at least 3.0 moles of diphenylsiloxane units per kilogram of the total polymer, from 0 to 3.16 moles of dimethylsiloxane units per kilogram of the total polymer and from 0 to 0.5 mole of $(R_3SiO_{0.5})$ units per kilogram of the polymer wherein R is selected from the class consisting of alkyl, cycloalkyl and aryl radicals, said copolymeric organosiloxane having a molecular weight above about 4000.

References Cited by the Examiner

UNITED STATES PATENTS

| 2,486,162 | 10/49 | Hyde | 260—46.5 |
| 2,867,599 | 1/59 | Hurd et al. | 260—46.5 |
| 2,870,120 | 1/59 | Yusem | 260—46.5 |
| 2,894,930 | 7/59 | Clark | 260—46.5 |
| 2,899,403 | 8/59 | Lewis | 260—46.5 |
| 2,915,497 | 12/59 | Clark | 260—46.5 |

MURRAY TILLMAN, *Primary Examiner.*

MILTON STERMAN, H. N. BURSTEIN, WILLIAM H. SHORT, *Examiners.*